July 4, 1950   I. A. DENISON ET AL   2,513,292
ALKALINE PRIMARY BATTERY AND ELECTROLYTE THEREFOR
Filed Oct. 17, 1945

Inventors
IRVING A. DENISON
PAUL L. HOWARD

By Ralph L. Chappell
Attorney

Patented July 4, 1950

2,513,292

UNITED STATES PATENT OFFICE 2,513,292

ALKALINE PRIMARY BATTERY AND ELECTROLYTE THEREFOR

Irving A. Denison, Silver Spring, Md., and Paul L. Howard, Arlington, Va.

Application October 17, 1945, Serial No. 622,920

4 Claims. (Cl. 136—106)

(Granted under the act of March 3, 1883, as amended April 30, 1928; 370 O. G. 757)

Our invention relates to an improved alkaline primary battery. More specifically we disclose a primary battery using a high normality alkaline electrolyte with an agent to counteract the effect of soluble ionic and colloidal positive electrode particles from either dispersing into the electrolyte or depositing on the negative electrode.

Batteries are known in the prior art, using a consumable zinc electrode together with an alkaline electrolyte. However, such cells have suffered from the disadvantage that increased normality of alkaline electrolytes results in increased corrosion of the zinc. This results from the transferring of positive particles to the zinc causing a further reduction of wet shelf life particularly where readily reducible positive electrodes are used to reduce polarization. Prior art batteries have also suffered from the disadvantages of being able to produce only a portion of the theoretically available energy and to operate at reduced efficiency at both low and elevated temperatures.

In accordance with our invention an alkaline electrolyte with an added agent is disclosed which effectively increases the wet shelf life of an alkaline primary battery.

Also in accordance with our invention a battery is produced having the ability to withstand a high continuous rate of discharge without appreciable decrease in voltage.

Further in accordance with our invention provision is made for restricting the circulation of electrolyte about the electrodes.

Our invention is further characterized by the provision of means to prevent the dissolving of anode and cathode material by the electrolyte.

Another feature of our invention resides in the fact that an extremely large share of the theoretical capacity of the battery may be utilized.

Still another characteristic of the battery structure which we disclose is the light weight per ampere hour of capacity.

A still further characteristic of our invention resides in the fact that the desirable discharge characteristics are maintained in spite of operation at the extremes of temperature likely to be encountered in use.

Our invention also resides in features of construction, combination and arrangement herein described or disclosed.

Figure 1:
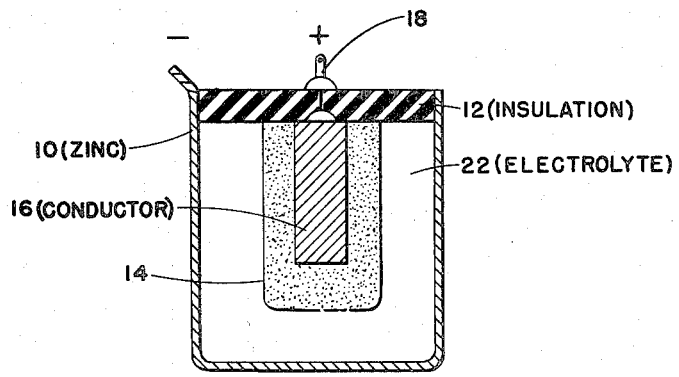
Figure 1 is a section view of one embodiment of a battery constructed in accordance with our teachings.

In Figure 1 the battery case 10 consists of a zinc can which serves as the outer negative electrode. Suspended within the can, for example, by means of insulation 12, is the electro-positive electrode 14 which, in our preferred embodiment, may have a metallic core 16 brought out to a terminal 18. The space 22 between the electrodes is occupied by the electrolyte which preferably consists of sodium hydroxide together with certain buffering compounds which will be described in detail below.

Figure 2:
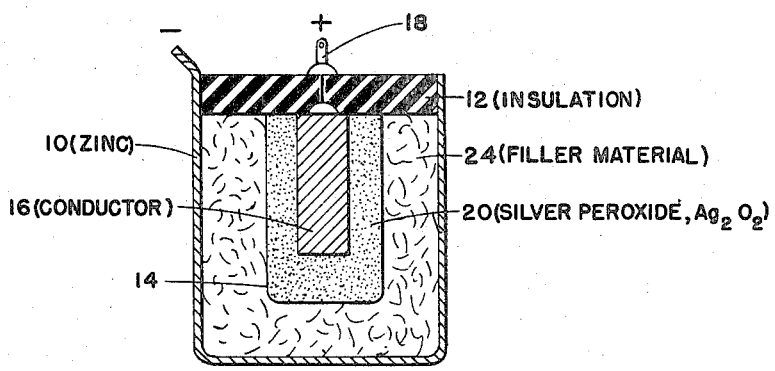
Figure 2 is a sectional view of a preferred embodiment using a filler material in the electrolyte chamber and an electrolytic silver peroxide anode.

Figure 2 shows structure similar to that in Figure 1 except for the addition of filler material 24 which preferably consists of nylon, polystyrene, chopped asbestos or similar inert material. In this embodiment the active positive electrode consists of an electrolytic silver peroxide body 20 of the formula $Ag_2O_2$.

Many primary battery applications require a high discharge rate at a substantially constant voltage and a slow rate of deterioration upon standing in the wet condition during a period of storage or dormancy. Such applications are particularly numerous in military and naval equipment where light weight and dependability after a period of storage are of paramount importance.

In order to prevent corrosion during storage, various means have been devised for releasing the electrolyte immediately prior to use. This has been accomplished, for example, by the breakage of a breakable glass container or diaphragm. The use of such batteries, however, is accompanied by the disadvantage that a mechanical force is required to accomplish the release of the electrolyte and further that corrosion takes place at a high rate during the dormancy period between periods of intermittent heavy discharge. Further, such batteries cannot be made of optimum size since separate provisions must be made for the storage of the electrolyte out of contact with the electrode.

An inherent requirement of a battery having a high discharge rate is an active negative electrode and a plentiful supply of ions in the electrolyte. The use of zinc, zinc alloy or zinc containing material as the consumable negative electrode is desirable since zinc is a fairly active metal and is both inexpensive and widely used in battery manufacture. Because of the high ionic dissociation of sodium hydroxide, potassium hydroxide and similar alkali metal hydroxides, water solutions of these compounds are normally considered satisfactory electrolytes. To produce a workable battery the zinc and alkaline hydroxide require in addition an electrode electropositive to zinc and a supply of oxygen to prevent polarization of the cell. For example, we have found that electrolytic silver peroxide is accompanied by certain novel advantages when used as the positive electrode. The equation of the reaction taking place at the electrolytically formed silver peroxide electrode is as follows:

$$AgO + 2H^+ + 2e \rightarrow Ag + H_2O$$

As stated above the use of a concentration of the hydroxide electrolyte sufficiently great to enable a high discharge rate seriously corrodes the zinc electrode. In this case the zinc is dissolved by the solution, entering the solution as zinc hydroxide. The corrosion of the zinc electrode is aggravated by any impurity in or on the zinc tending to set up electric couples thereby producing local action. In the case of the positive electrode, it has been found that, for example, where a silver peroxide electrode is used both silver peroxide and silver oxide enter the solution in the ionic and colloidal state; however, this solubility is small.

The zinc electrode cannot be protected from these silver ionic and colloidal particles in the electrolyte by conventional separators or special semipermeable films because of the minute particle size. As previously stated it is necessary to prevent the transference of such particles in order to maintain the zinc electrode free from undue corrosion. Thus it is necessary to have an electrolyte compound of the proper hydroxyl ion concentration plus an additional ingredient which has the property of collecting the colloidal and ionic silver into conglomerates of such a size that a separating medium as stated above is effective in stopping any deposit of positive electrode material, for example, silver, on the zinc electrode. Such an ingredient is herein termed a "salting out" medium and the action a "salting out" effect. In addition, these materials act as buffers in maintaining the hydroxyl ion concentration substantially constant.

We have found that the salting out effect may be accomplished with a number of materials to be described. In a typical application satisfactory results have been attained with an electrolytic silver peroxide positive electrode and zinc negative electrode in an alkaline medium to which these materials are added in varying amounts. In addition to conventional alkaline hydroxides, water solutions of alkali metal ethylates with or without additional ingredients disclosed below are effective. The materials found most effective as "salting out" materials are the alkali metal zincates and boric acid solutions of alkaline hydroxides forming the alkali metal borate.

The following examples illustrate the method of preparation of the "salting out" buffering solutions mentioned. It will be understood that any alkali metal hydroxide may be used in such preparation without appreciably affecting the "salting out" and buffering action.

*Example 1.—Potassium ethylate*

Potassium ethylate was prepared from potassium hydroxide and ethyl alcohol combined in molecular proportions with the addition of a small amount of water to facilitate solution of the hydroxide. The reaction proceeds according to the equation $$C_2H_5OH + KOH \rightarrow C_2H_5OK + H_2O$$

The solution was refluxed for several hours and evaporated to a pasty condition to form the potassium ethylate used in making up the electrolyte. Sodium hydroxide may be substituted for potassium hydroxide if desired. A satisfactory electrolyte was formed using 30% to 60% of the alkali ethylate in water solution alone. It was found that the addition of from 3% to 35% zinc oxide or from 7% to 35% boric acid increased the salting out effect.

*Example 2.—Sodium hydroxide—sodium zincate solution*

A solution of sodium zincate in sodium hydroxide was prepared in the following manner: Zinc hydroxide prepared by precipitation from zinc chloride by ammonium hydroxide was shaken for 12 hours with a solution containing an equivalent amount of sodium hydroxide to react according to the equation $$Zn(OH)_2 + 2NaOH \rightarrow Na_2ZnO_2 + 2H_2O$$

After warming on the water bath for two hours, the solution was filtered. Equal parts of the filtrate and water by volume were added to a 14 normal sodium hydroxide solution in such proportions to produce a solution with a pH value of 9.8.

Satisfactory sodium zincate solutions were formed in accordance with the above reaction using from 10 to 50% of sodium hydroxide with 3% to 35% zinc hydroxide. If potassium hydroxide (10% to 50%) is used in place of the sodium hydroxide, the range for zinc hydroxide is 1% to 5%.

*Example 3.—Sodium hydroxide—boric acid solution*

With the object of preparing buffered solution of sodium hydroxide having relatively low pH value, various amounts of boric acid were dissolved in 25 milliliter portions of 14 normal sodium hydroxide. The reaction is believed to proceed as follows:

$$H_3BO_3 + 3NaOH \rightarrow Na_3BO_3 + 3H_2O$$

or $$H_3BO_3 + NaOH \rightarrow NaBO_2 + 2H_2O$$

A solution consisting of 1.87 grams of boric acid in 25 milliliters of 14 normal sodium hydroxide solution resulted in a pH value of 9.25.

It was found that an electrolyte may be formed in accordance with the above reaction using from 10% to 50% alkali metal hydroxide with 7% to 35% boric acid.

The use of a buffer is known in the art in connection with other chemical reactions, especially those encountered in qualitative and quantitative analysis. Upon depletion of the hydroxyl ions during the use of the battery, additional hydroxyl ions are supplied by the hydrolysis of the potassium ethylate, sodium zincate or sodium borate in the three examples given. This maintains a constant concentration of hydroxyl ions. The salting out materials act both as a buffering agent and also to accomplish the salting out of silver ions and colloidal particles.

While the use of a salting out solution results in a marked decrease of electrode deterioration, further improvement can be obtained by the use of a filler material to prevent free circulation of the electrolyte. In the case of the negative zinc electrode, reduction of circulation results in the holding of zinc ions near the electrode thereby causing an increase of zinc hydroxide in solution to the extent that formation of further zinc ions is inhibited. This enables relatively high hydroxyl ion concentration to be used without excessive corrosion of the zinc. We have found that asbestos in the chopped or fibrous form, nylon fiber, polystyrene fiber, or similar inert materials allowing the passage of ionic current but inhibiting circulation and migration of the coagulated colloidal particles are satisfactory filler materials. The material should preferably have no chemical reducing effect on the positive electrode.

As previously stated in the above example we have found that electrolytic silver peroxide is extremely suitable as a positive electrode material, particularly because of its readily reducible nature. The chemical reaction taking place in the cell using electrolytic silver peroxide and zinc electrodes is probably expressed by the following reactions:

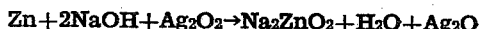
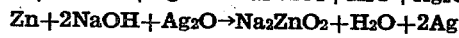

$$Zn + 2NaOH + Ag_2O_2 \rightarrow Na_2ZnO_2 + H_2O + Ag_2O$$
$$Zn + 2NaOH + Ag_2O \rightarrow Na_2ZnO_2 + H_2O + 2Ag$$

The suitability of silver peroxide as a positive electrode material has been found to be somewhat dependent on the method of formation. It has been found that desirable characteristics are obtained when the silver peroxide is formed electrolytically from a pure silver electrode. The process of formation using the silver electrode as the positive pole is believed to take place in two steps: first, the production of silver oxide, secondly, the production of the peroxide from the oxide. This is indicated by the formation curve shown in Figure 3. It is believed that the rises in voltage during formation are respectively due to the complete formation of silver oxide from silver, and the complete conversion of the lower oxide to the peroxide form.

Satisfactory positive electrodes have also been produced by applying silver oxide in paste form on a metallic screen or other backing, reducing to silver either electrolytically or by means of a flame, and oxidizing electrolytically to the silver peroxide as discussed above. Electrolytic formation is believed advantageous because of the spongy texture of the peroxide formed. Other means of forming the silver peroxide positive electrodes will appear to those skilled in the art. For example, silver peroxynitrate of the formula $Ag_7NO_{11}$ may be used as a starting material and reduced by some means, for example the application of hot water, to form silver peroxide. However, such chemical methods do not produce a low resistance electrode comparable to that produced electrolytically.

The desirability of using a filler material to inhibit the corrosion of the negative electrode has been discussed; however, we have found that filler material utilized in accordance with our teachings can also be used to greatly reduce corrosion of the positive electrode. The high concentration of sodium hydroxide tends to attack the silver peroxide positive electrode for two reasons: first, because of the solubility of both silver oxide and silver peroxide in strong concentrations of sodium hydroxide; secondly, because high hydroxyl ion concentration encourages the dispersion of silver oxide and silver peroxide from the parent mass in colloidal form. Such colloidal material unless impeded gradually drifts to the zinc electrode where it combines with the zinc to aggravate the corrosion at the negative electrode. Various types of cellulosic materials were investigated in order to produce a barrier pervious to ions but which would impede colloidal particles. It was found however that the use of cellulosic materials was not desirable since the barrier material acted as a reducing agent, reducing the silver oxides to metallic silver and thus adversely affecting the positive electrode.

Thus it is seen that the use of a salting out material aids in reducing the colloidal drift since as indicated by our studies, the acid ion causes the aggregation of the colloidal particles to particles of such a size that the migration is more easily inhibited by the filler material.

Both sodium hydroxide and potassium hydroxide have been mentioned above as a plentiful source of hydroxyl ions. However, in our preferred embodiment, we have used sodium hydroxide since the zincate formed at the time of discharge is more soluble in sodium hydroxide than potassium hydroxide. Stated another way sufficient zincate can be added to the battery initially to serve as an effective buffer without approaching the saturation point. Thus as the zincate is formed during the discharge it will be soluble and not cause a lowering of battery capacity. If potassium hydroxide is used with a zincate buffer it is necessary to use a practically saturated solution of zincate to obtain sufficient buffering action. Thus zincate entering the solution as a result of discharge will reach saturation and start to precipitate early in the discharge. Such precipitation reduces the effective plate area available for discharge.

Figure 3:
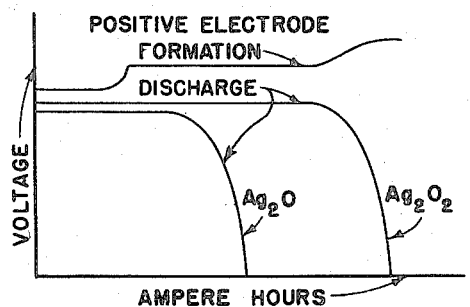
Figure 3 is a characteristic plot showing the discharge curve of a battery of the type shown in Figure 2.

In Figure 3 two typical discharge characteristic curves are given. It will be seen that either a silver oxide or an electrolytic silver peroxide positive electrode results in a practically constant voltage discharge curve. The advisability of using an electrolytic silver peroxide is indicated graphically by the fact that the area under the silver peroxide curve is more than 50% greater than that under the silver oxide curve, indicating a greatly increased energy output where an electrolytic silver peroxide is used. No break in the discharge curve occurs as the peroxide changes to the simple oxide form. We have found that a slow electrolytic formation of the silver peroxide anode causes increased available energy for a given weight of battery material.

It will be seen from the above that we have produced a battery having distinct advantages over batteries used in the prior art, particularly with regard to shelf life, sustained voltage during high rates of discharge, and available energy per unit weight. We have shown a specific mechanical construction in Figures 1 and 2; however, it will be obvious to one skilled in the art that batteries constructed according to our teachings may take any desired structural form without appreciable effect on electrical output. While we have shown and described particular embodiments of our invention, it will occur to those skilled in the art that various changes and modifications can be made both chemically and mechanically without departing from our invention and we therefore aim in the appended claims to cover all such changes and modifications that follow in the true spirit and scope of our invention.

The invention described herein may be made and used by or for the Government of the United States for governmental purposes without the payment to us of any royalties thereon or therefor.

What we claim is:

1. An electric battery comprising a zinc negative electrode, a silver peroxide positive electrode, an electrolyte comprising sodium hydroxide and a salting out material consisting of an alkali metal ethylate soluble in said sodium hydroxide solution.

2. An electric battery comprising a zinc negative electrode, an electropositive electrode and an electrolyte including an alkali metal ethylate in water solution.

3. An electric battery comprising a zinc negative electrode, an electropositive electrode, and an electrolyte consisting of 30 to 60% alkali metal ethylate, 3 to 35% zinc oxide and the remainder water.

4. An electric battery comprising a zinc negative electrode, an electropositive electrode, and an electrolyte consisting of 30 to 60% alkali metal ethylate, 7 to 35% boric acid and the remainder water.

IRVING A. DENISON.
PAUL L. HOWARD.

REFERENCES CITED

The following references are of record in the file of this patent:

UNITED STATES PATENTS

| Number | Name | Date |
| --- | --- | --- |
| 458,424 | Lugo | Aug. 25, 1891 |
| 692,298 | Jungner | Feb. 4, 1902 |
| 793,078 | Hubbell | June 27, 1905 |
| 1,624,845 | Nyberg | Apr. 12, 1927 |
| 1,675,828 | Siegmund | July 3, 1928 |
| 2,018,563 | Martus | Oct. 22, 1935 |
| 2,422,045 | Ruben | June 10, 1947 |

FOREIGN PATENTS

| Number | Country | Date |
| --- | --- | --- |
| 16,471 | Great Britain | of 1915 |
| 335,587 | Great Britain | Sept. 29, 1930 |
| 95,423 | Switzerland | July 1, 1922 |

OTHER REFERENCES

Vinal et al., Circular No. 79, Bur. Stds. (1923), page 7.

Denison, L. A., Trans. Electrochemical Society, vol. 90 (1946), page 397.